A. E. BURNSIDE.
Cartridge.
No. 1,428. Reissued Mar. 10, 1863.
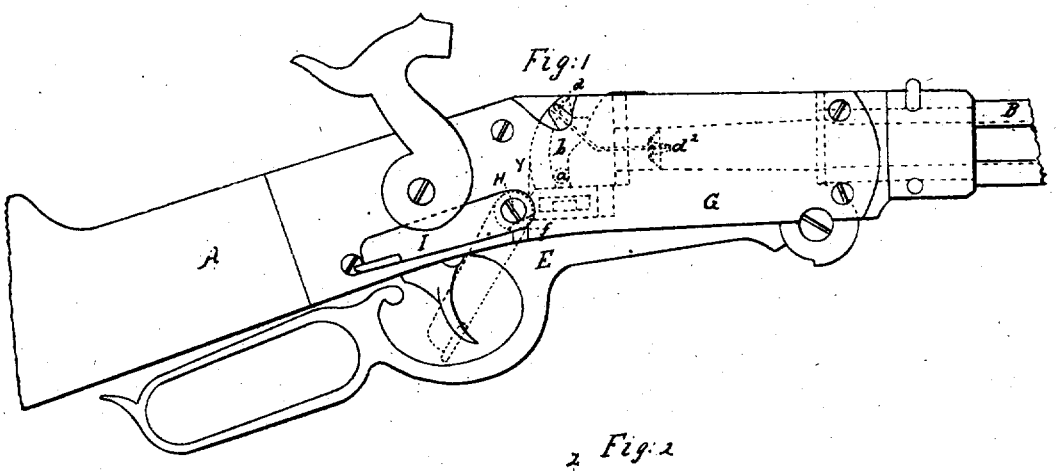
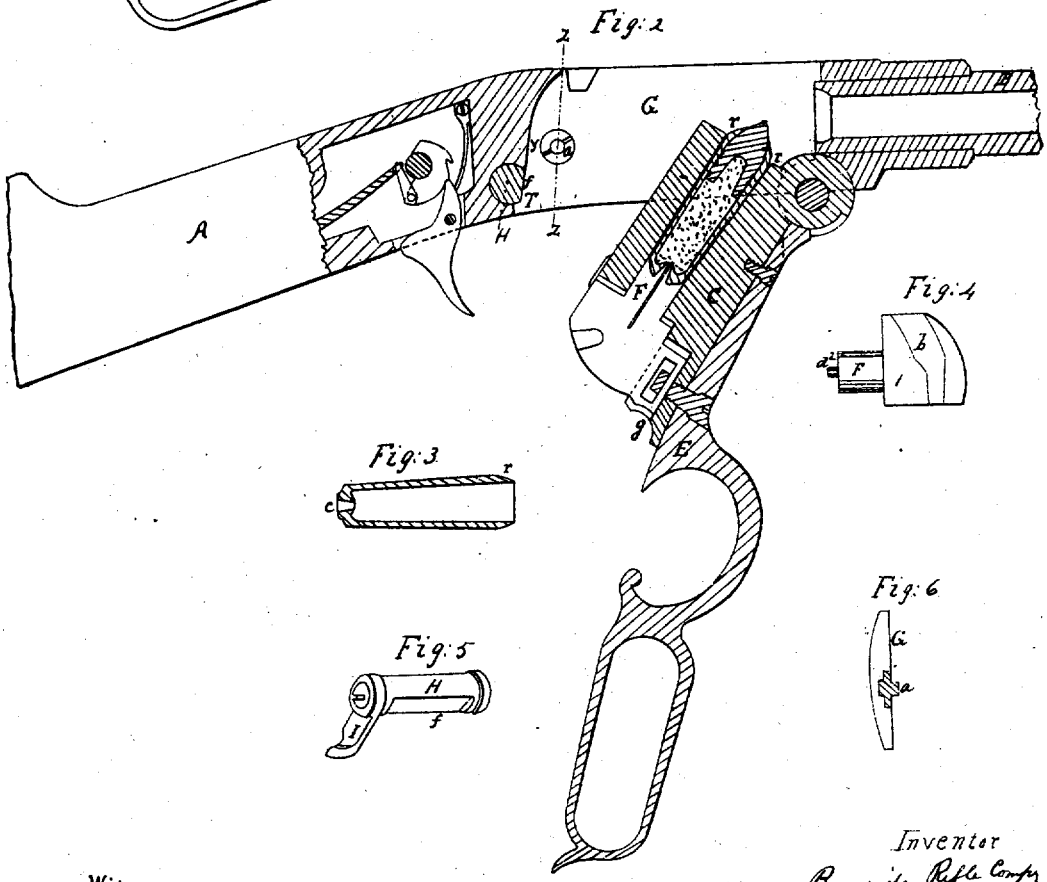
Witnesses
P. E. Wilson
E. Krauss Jr.
Inventor
Burnside Rifle Comp.
By atty A. B. Stoughton

UNITED STATES PATENT OFFICE.

THE BURNSIDE RIFLE COMPANY, OF PROVIDENCE, RHODE ISLAND, ASSIGNEES OF AMBROSE E. BURNSIDE.

IMPROVEMENT IN METALLIC CARTRIDGES FOR BREECH-LOADING FIRE-ARMS.

*Specification forming part of Letters Patent No.* 14,491, *dated March* 25, 1856; *reissue No.* 1,428, *dated March* 10, 1863.

DIVISION A.

*To all whom it may concern:*

Be it known that AMBROSE E. BURNSIDE, of Bristol, in the county of Bristol and State of Rhode Island, did invent a certain new and useful Cartridge, of which the following is a full, clear, and exact description, reference being had to the accompanying drawings, making part of this specification, in which—

Figure 1 is a side view of a rifle to which the said cartridge is more particularly adapted; Fig. 2, a longitudinal section through the same, one of the improved cartridges being shown in section within the chamber in the cartridge-block, which is represented as swung away from the barrel. Fig. 3 is a section through one of the improved cartridge-cases; Fig. 4, view of the breech-pin detached; Fig. 5, detached view of the bolt which locks the cartridge-block; Fig. 6, section on the line *z z* of Fig. 2.

The chief difficulty experienced in the construction and use of breech-loading fire-arms arises from the tendency of the discharge to open the joint between the barrel and the cartridge-block, the two being forced in contrary directions by the explosion of the charge, and, however exact the workmanship or strong the parts may be, the open joint will leak and the bearing-surfaces be fouled.

To remedy this inconvenience is the object of the invention of the said BURNSIDE, which consists of a cartridge-case made of metal sufficiently soft or yielding to permit of its expansion at the instant of the discharge, to pack the joint between the cartridge-block and the barrel, the said cartridge-case being made conical or tapering, to facilitate its withdrawal from the cartridge-chamber, and having an enlargement or swell a short distance back of its forward end to fill the enlargement of the bore in the rear end of the barrel, made for the purpose of admitting the advance end of the cartridge.

The cartridge is more particularly designed to be used in connection with a breech-loading rifle having a cartridge-block which is made to abut against the end of the barrel, with the axis of the cartridge-chamber within the block coincident with that of the barrel, the cartridge-case being so formed as to enter a short distance into the rear of the barrel, and pack the joint between it and the cartridge-block.

The rifle to which this improved cartridge is more particularly applicable is represented in Figs. 1, 2, 4, 5, and 6, of the accompanying drawings.

This rifle forms the subject of another application for reissued Letters Patent, made simultaneously with this, and will now be only so far described as may be necessary to the proper understanding of the construction and operation of the cartridge-case.

The stock A is connected with the barrel B by a metallic breech, which is attached to the stock by screws or otherwise, and to the forward end of which is secured the barrel. The sides G of the breech form the walls of a box or receiver, which is open at the top and bottom, and in which plays the movable cartridge-block C. This block is secured to the guard-lever E, which is pivoted to the forward end of the breech near the end of the barrel, so that when the lever is swung up into place as in Fig. 1, the cartridge-block shall abut against the end of the barrel, the axis of the latter coinciding with that of the cartridge-chamber. As neither the cartridge-block nor the barrel slides into or past the other, there are no rubbing-surfaces of contact between the two to produce friction or wear, but only a straight open joint, and it is this joint which the cartridge-case above referred to is designed to close and pack.

F is a sliding breech-pin, which forms the bottom or rear end of the cartridge-chamber, and to which a slight motion in the direction of the axis of the barrel is communicated in the following manner:

The breech-pin is seen detached in Fig. 4, and has a groove, *b*, upon one side, in which plays a pin, *a*, projecting from the inside of one of the sides G of the breech, Fig. 6.

This groove is so formed that when the cartridge-block is returned to its place, the breech-pin is drawn back to its greatest distance, as seen dotted in Fig. 1. In this position the nipple *d* is brought immediately beneath the hammer, ready to receive its blow.

As the block C is withdrawn, the breech-pin is advanced farther into it, as seen in Fig. 2, for a purpose that will be presently explained.

In order that the block C may not be thrown out of its position by the force of the discharge, the rear of the sliding breech-pin is curved from a center within the axis of the barrel, and is made to bear upon a seat, a small portion of which is correspondingly curved a short distance above and below the prolongation of the axis of the barrel.

The discharge is thus caused to retain the block in its firing position, for any force which acts to withdraw it away from the barrel must at the same time advance the breech-pin, but the force of the discharge acts to drive the latter back, and therefore to hold the block in its firing position. The projection *y* in the path of the breech-pin formed by the above-described construction might be sufficient to retain the block in its firing position; but, as it may be desirable to place the projecting portion of the curved surface lower down, as at T, and also for additional security, the following device, for the purpose of more unfailingly accomplishing this end, has been adopted:

H is a bolt which passes transversly through the breech, immediately on the rear of the block. This bolt is cylindrical, and is cut away upon one side *f*, to enable the block to be returned to its place; the bolt is then revolved by the thumb-piece or handle I, by which means its cylindrical portion is caused to enter a corresponding cavity, *g*, in the cartridge-block, which is thus held securely in place. In order that the piece may not be discharged until the bolt H has been turned into the cavity *g*, the handle I is caused to be over the guard, as seen in Fig. 1, and obstruct the entrance of the finger to the trigger whenever the cartridge-block is in place and not secured by its bolt.

The projection *y* also serves to force the breech-pin into the cartridge-chamber when the breech-pin is withdrawn, and may take the place of the pin *a* and groove *b*. In such case the breech-pin will be forced back by the cartridge as the cartridge-block is brought up to its firing position.

As before stated, the cartridge-case (seen in section in Figs. 2 and 3) is to be made of some metal that shall be sufficiently soft or yielding to allow it to pack the joint between the cartridge-block and the barrel by its expansion at the instant of the discharge, and in order that it may accomplish this end it is necessary that it enter a short distance into the rear end of the barrel; but as the ball projects a considerable distance in advance of the chamber, and is swung into the barrel in the arc of a circle, and also for the reason that the cartridge-case is necessarily larger than the bore of the barrel, the bore in the barrel requires to be enlarged at its extremity, and in order that the cartridge-case may readily enter the barrel, it requires to be made smaller at its extreme end than the mouth of the enlargement in the bore.

But as it is required to pack the joint between the cartridge-block and the barrel, it requires to be made sufficiently large directly back of its forward end to fill the enlarged opening which it has just entered. It is, therefore, necessary that the cartridge-case be made with a bulge or enlargement, *r*, Fig. 2, at its forward end, or directly back of it, as seen in the drawings, and it is obvious that this enlargement must correspond as nearly as possible with that in the end of the bore in the gun-barrel.

As the cartridge-case is necessarily required to fit tightly in its chamber, and as it is somewhat expanded by the discharge and jammed into its chamber, it is made conical or tapering, as represented, in order that it may be readily loosened and quickly removed after the discharge.

In the rear end of the cartridge-case is a depression, the form of which is adapted to that of the cone $d^2$ upon the breech-pin. The hole *c*, for the entrance of the fire from the cap, is closed with varnished paper, or tin-foil, or wax, and the powder is introduced, as seen in Fig. 2. The ball having been well tallowed, is then inserted, and the case is closed around it by pressure applied by hand, or in any suitably-formed press or swage.

What I claim as the invention of the said BURNSIDE, and desire to secure by Letters Patent, is—

1. A metallic cartridge-case so constructed as to pack the joint between the movable cartridge-block and the barrel, as set forth.

2. A conical cartridge-case operating as described, for the purpose of facilitating its withdrawal from the cartridge-chamber after the discharge of the gun.

3. The enlargement upon the forward end of the cartridge-case, operating as described.

ISAAC HARTSHORN,
*President Burnside Rifle Company.*

In presence of—
WM. PRATT,
HENRY MARTIN.